April 17, 1928.
E. J. SWEETLAND
FILTER
Filed Dec. 1, 1920
1,666,515
3 Sheets-Sheet 1
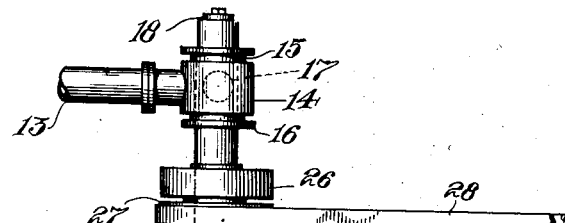
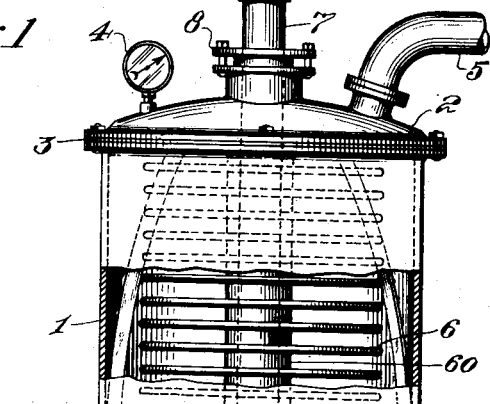
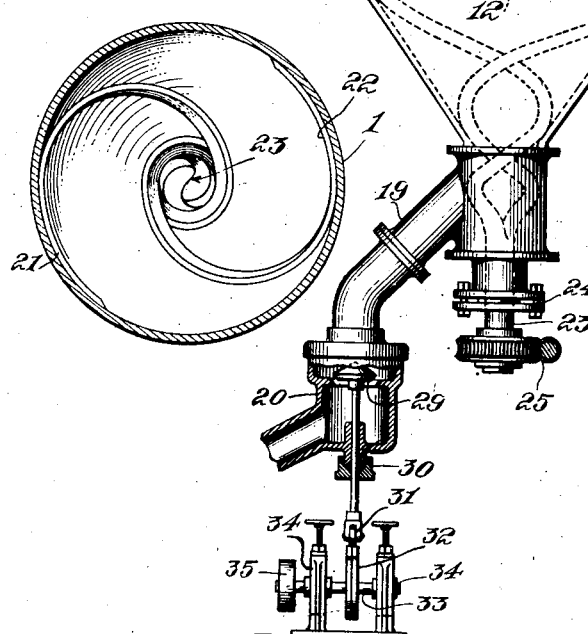
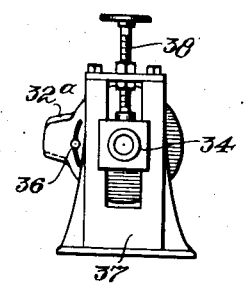
INVENTOR
Ernest J. Sweetland
BY
ATTORNEYS

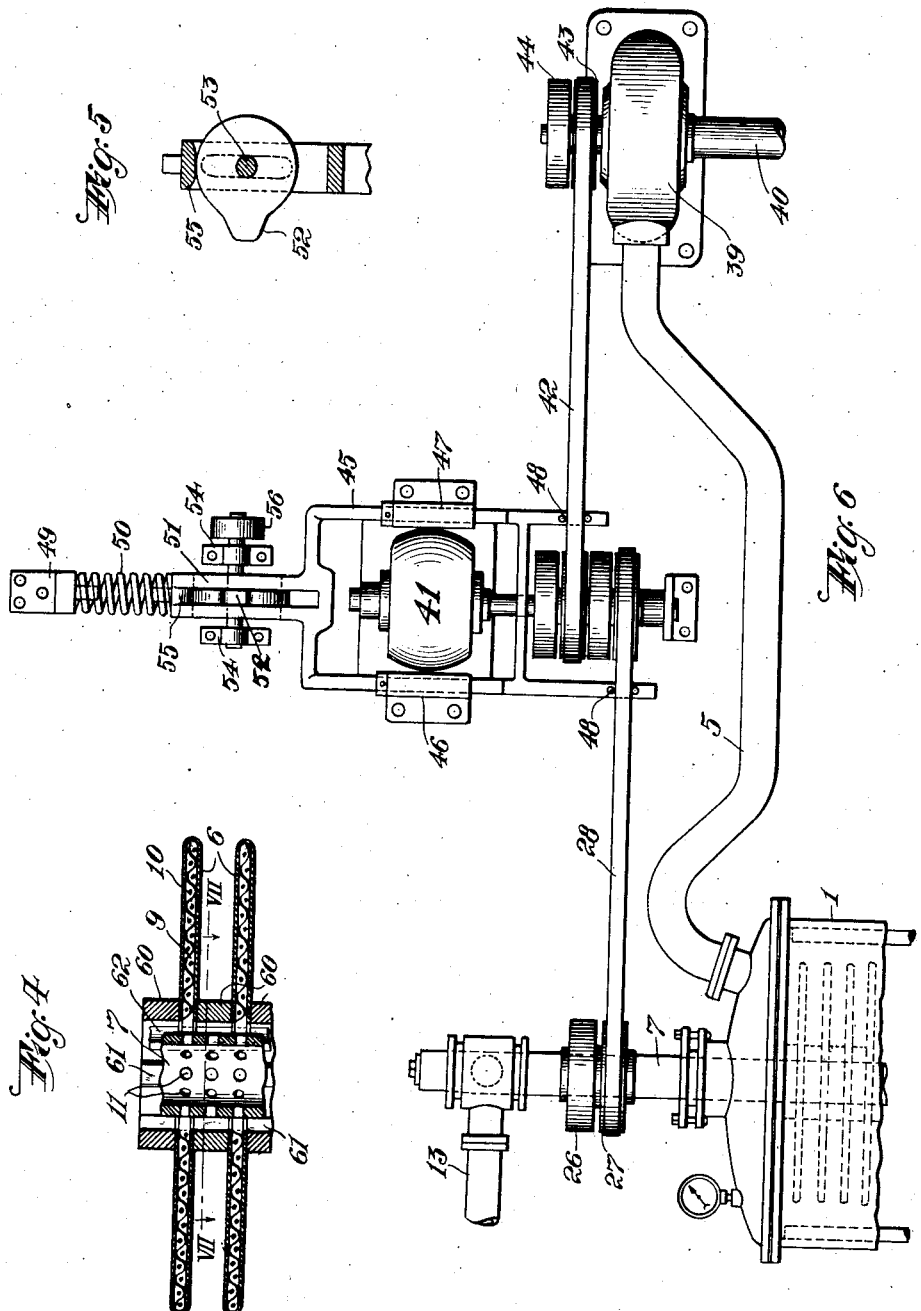

April 17, 1928.
E. J. SWEETLAND
1,666,515
FILTER
Filed Dec. 1, 1920
3 Sheets-Sheet 3
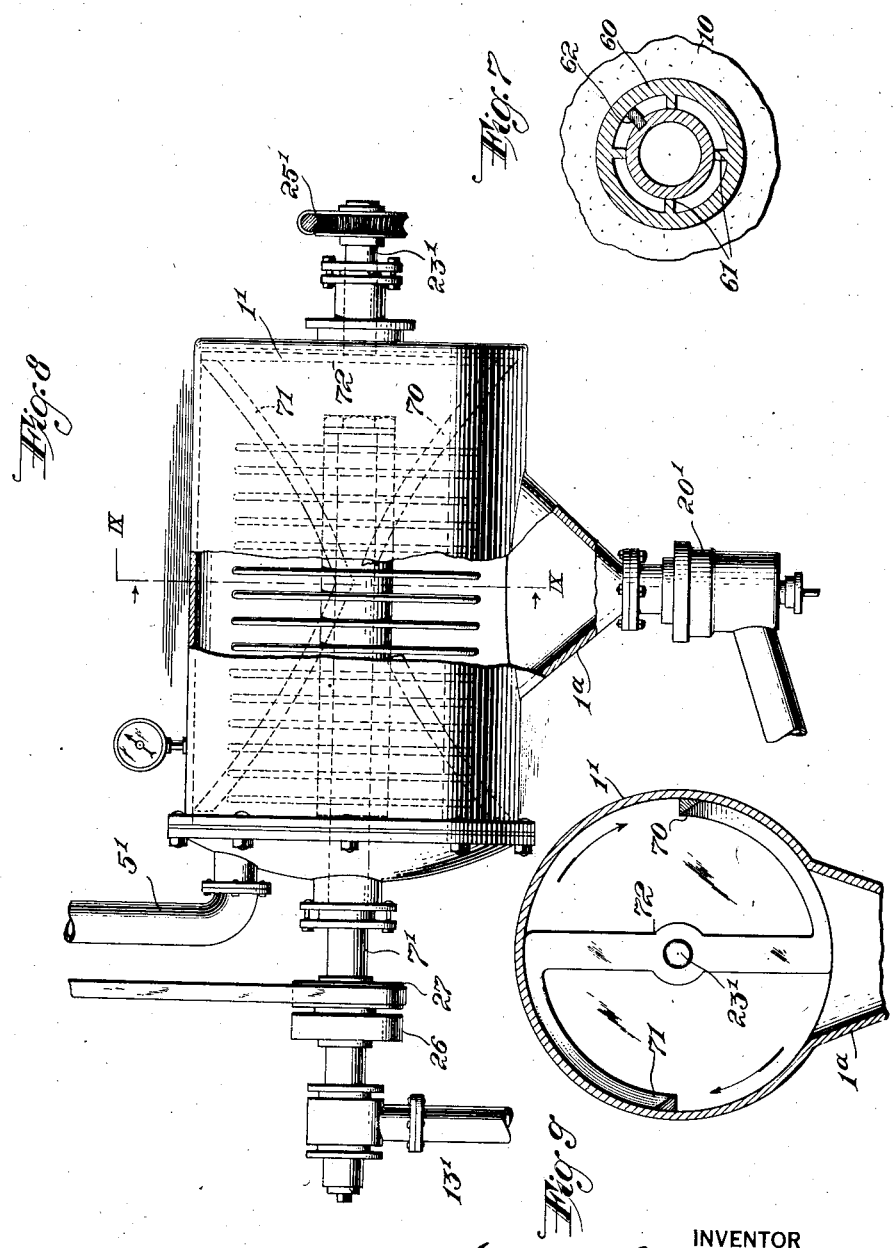
INVENTOR
Ernest J. Sweetland
BY
ATTORNEYS.

Patented Apr. 17, 1928.

1,666,515

UNITED STATES PATENT OFFICE.

ERNEST J. SWEETLAND, OF MONTCLAIR, NEW JERSEY.

FILTER.

Application filed December 1, 1920. Serial No. 427,652.

This invention relates to methods of and means for filtering or thickening a sludge and is particularly adapted for liquids in which the solid matter is very finely divided and present to a comparatively small percentage. Such a sludge is exceedingly difficult to handle in filters of the ordinary type, whether vacuum or pressure operated, because in a period of only a few minutes the finely divided solids form a thin layer or cake which offers such high resistance as to make further filtration at a commercial rate practically impossible. It is, therefore, necessary at the present time either to acquiesce in a very slow, uneconomical rate of filtration, or to clean the filter very often— an operation which, with the present type of filter, is at once time-consuming and expensive.

It is the primary object of the present invention to provide a filter or thickener in which the cleansing takes place automatically at short intervals of time, and in which the cleansing operation is carried on so effectively as to require but a few seconds, so that the filtration proceeds almost continuously and without any manual intervention. Although capable of producing a substantially dry cake, in its illustrated form, the filter is arranged to bring about only a partial separation of the liquids and solids, in other words a thickening of the sludge. During the thickening operation above referred to, the solid matter becomes agglomerated into particles of a size suitable for filtration, subsequently, in case this proves desirable.

Various other features and objects of the invention will be more readily understood from the following description of certain specific forms of embodiment of the invention, reference being had to the accompanying drawings in which Figure 1 is a side elevation of one form of device embodying my invention; part of which is shown cut away to afford a view of the interior thereof;

Figure 2 is a top plan view of Figure 1 with the cover and filtering device removed from the tank to show the spiral shape of the scraping members hereinafter mentioned;

Figure 3 is a side view of part of the mechanism of Figure 1;

Figure 4 is a sectional view showing the manner in which the filter leaves 6 are secured to the shaft 7;

Figure 5 is a view showing part of the mechanism of Figure 6;

Figure 6 is a view showing one form of mechanism for governing the operation of the device of Figure 1;

Figure 7 is a view showing a section of Figure 4 on line VII—VII, looking in the direction of the arrows;

Figure 8 is a view showing a modification of the apparatus of Figure 1, and

Figure 9 is a view showing a section of Figure 8 on lines IX—IX, looking in the direction of the arrows.

Similar characters of reference designate similar parts in each of the several views.

In Figure 1 of the drawing, reference numeral 1 designates a tank provided with a cover 2, secured to the tank by means of bolts, a gasket 3 being employed to render the joint between the tank and cover airtight, 4 is a gauge for indicating the pressure in the tank, and 5 is an inlet pipe through which the sludge which is to be filtered or thickened may be introduced into the tank. A number of filter leaves 6 are suspended in the tank, these leaves being mounted on a hollow shaft 7 which extends through the cover of the tank, a stuffing box 8 being employed to render the joint pressure-tight. Each filter leaf consists of an annular frame comprising a coarse wire screen 9 (Figure 4) enclosed by canvas 10 or other filtering material, such as metallic cloth. These filter leaves are well known in the art and, therefore, are not described herein in detail. They are spaced from each other by means of collars 60 which are provided with ribs 61 (Figure 7) on their interior surface whereby the collars are uniformly spaced from the shaft and form an annular drainage space about the shaft. A key 62 cooperating with key-ways in the shaft and in the leaves serves to lock the leaves on the shaft. It will now be clear that the liquid in the tank will pass through the filtering material of each leaf into the interior drainage chamber formed by the framework or screen of the leaf. From this chamber it passes into the annular drainage space formed by the collars 60, from which space it passes through perforations 11 into the interior of the hollow shaft 7 which thus forms a conduit common to the various leaves of the filter. The lower end of shaft 7 is closed as indicated at 12 and the upper end thereof communicates with a discharge tube 13 through a hollow casting 14 which surrounds the shaft, stuffing boxes 15 and 16 being provided between the shaft and the casting to prevent leakage. The shaft is perforated, as indicated at 17, in the part enclosed by the casting 14, so that the liquid in the conduit formed by the interior of the shaft is free to enter into the annular space provided by casting 14 from which space it passes to the discharge tube 13. The upper extremity of shaft 7 is sealed as indicated at 18.

During the operation of the apparatus the shaft 7 is alternately held stationary and rapidly rotated as described hereinbelow, a fast pulley 26 and a loose pulley 27 being, for this purpose, provided on the shaft for cooperating with a belt 28, which belt is driven by mechanism hereinafter described.

The lower part of the tank 1 is conical in shape and communicates with a discharge pipe 19 in which is provided a valve 20, which valve may be of the ordinary hand operated type or of the automatic type illustrated in the drawing. In this form it consists of a valve member 29, the stem of which extends downwardly through a stuffing box 30 and is provided with a roller 31 which rides upon a cam 32. This cam is rigid with a shaft 33 which is journaled within bearings 34 and provided with a pulley 35 by means of which it can be driven in timed relation to the remaining filter mechanism. The cam 32 is formed of two sections or halves which have a pin and slot connection 36, as shown by Figure 3. Each half of the cam is formed with a cam element 32ᵃ and by properly adjusting the two halves of the cam, these cam elements can be brought into such relation to each other as to partially or entirely overlap each other and provide a short or a long cam. This enables the cam to be adjusted for holding the valve member 29 in an open position for a longer or a shorter period of time, as may be desired. The bearings 34 are shown as vertically movable within slotted standards 37 and as being connected to adjusting screws 38 by means of which they can be raised or lowered. It will be quite obvious that other mechanical means may be employed to obtain these results when carrying out the invention.

For the purpose of removing solid matter which may adhere to the inner surface of tank 1, I provide a scraper which, in the illustrated form of embodiment, consists of a plurality of arms 21 and 22. These arms are substantially spiral in form, as indicated in the drawings, particularly in Figure 2, and arranged to be rotated slowly by means of a shaft 23 extending through the bottom of tank 1, through a stuffing box 24, worm gearing 25 being employed to impart to the shaft a slow and continuous rotary motion. As the shaft is thus rotated, the arms 21 and 22 scrape along the inner surface of the tank and because of their spiral shape force the adhering matter downwardly toward the bottom of the tank and into the discharge pipe 19, from which pipe it is periodically discharged by the valve 20.

The liquid to be filtered, or sludge, is supplied under pressure to filter tank 1 by means of a centrifugal pump 39 (Fig. 6), the intake of which is shown at 40 and the discharge of which is connected to the tank by means of the pipe 5 hereinbefore mentioned. A motor 41 is provided to drive the pump 39 and the shaft 7 in alternation with each other. The shaft of the motor is for this purpose provided with two pairs of pulleys, the lower pair of which is arranged to drive by means of a belt 28 the fast and loose pulleys 26 and 27, respectively, of shaft 7 and the upper pair of which is arranged to drive through the belt 42 the fast and loose pulleys 43 and 44, respectively, of the pump 39. Mechanism is provided for shifting and controlling the belts 28 and 42 in such a manner that the pump 39 is driven when the shaft 7 is stationary, and is idle when the shaft 7 is being rotated. To shift the belts 28 and 42 I provide an arrangement illustrated as comprising a yoke 45 slidably mounted in guides 46 and 47. The part 51 of the yoke is slotted to receive a cam 52 fixed to a shaft 53 mounted in fixed bearings 54. This cam is arranged to co-act with a follower 55 integral with the yoke. The yoke is supported by the cam 52 and is pressed downward by a helical spring 50 interposed between the yoke and a fixed abutment 49, to maintain the follower 55 in engagement with the cam. A pulley 56, which may be driven by any desired mechanism, is provided to rotate the cam in timed relation with the remaining part of the apparatus, so that the follower 55, and, therefore, the yoke 45, are raised at periodic intervals. This movement of the yoke serves to shift belts 28 and 42, pins 48 being provided on the yoke to engage the edges of the belt. If desired, the cam 52 may be made adjustable, and formed of two elements, as illustrated in Figure 3.

The operation of the filter mechanism will now be readily understood. With the driving mechanism in the position shown in the drawing, the pump 39 is supplying the sludge under pressure to the tank 1 so that the filtrate passes through the leaves 6 into shaft 7 from which it escapes through the discharge pipe 13. After a period of time, depending upon the kind of sludge which is being filtered, the cloth of the filter leaves becomes so thoroughly clogged with precipitate that filtration no longer proceeds at a commercial rate. This period may, for example, be three or four minutes. At the end of this period of time the cam 52 brings about a shifting of belts 28 and 42 so that pump 39 is shut off, whereas the shaft 7 is brought into rapid rotation. Owing to the stoppage of the pump, the pressure drops in tank 1 so that the filter cake is no longer forced against the surface of the leaves but, to the contrary, tends to be displaced by a certain amount of back-wash of the filtrate which is in the drainage chambers of the leaves and which is forced out through the pores of the filter leaves by centrifugal pressure. The rapid rotation of these leaves in the sludge of the tank serves to dislodge the filter cake in a rapid and surprisingly effective manner, even the most tenacious and sticky precipitate being dislodged in a few seconds' time. The dislodged filter cake settles toward the bottom of the tank. There is a tendency for a small portion of the cake to be thrown into suspension by the agitation, but experience has shown that the greater part of the material will rapidly precipitate to the bottom of the tank, even though the same was originally exceedingly fine and flocculent.

After a short period of time, say four seconds, the filter cake will have been completely removed from the leaves. At the end of this time the cam 52 will pass from under follower 55, and the yoke 45 will shift the belts back to their original positions, so that the filter leaves will cease their rotation and the pump 39 commence to operate. Filtration is thus resumed.

It will thus be understood that in accordance with this invention periods of filtration and cleansing are caused to alternate with each other automatically in rapid succession. The sludge in the tank becomes thicker with each cycle and the heavier part thereof settles in the conical part of the tank, from which it is automatically withdrawn at suitable intervals through the valve 20. The spiral scraper removes filter cake which adheres to the inner wall of the tank and forces the same downwardly into the discharge pipe.

The sludge of which the solid matter may have constituted only 1% at the outset is thus thickened into a paste which may comprise 20 to 60% or more of solid material, and which therefore is readily filtered in the usual manner after it has been discharged from the thickening device.

The form of embodiment of the invention illustrated in Figure 8 differs from the preceding one in that tank 1' and the shaft 7' are horizontal instead of vertical. At its lower side the tank is provided with a conical chamber 1ª, which is arranged to communicate with a discharge valve 20' similar to that of Fig. 1.

In this embodiment the scraper consists of a pair of arms 70 and 71, each of which is V-shaped and arranged to be rotated in the direction of the arrows of Figure 9. The filter cake which adheres to the surface of the tank is thus forced toward the middle thereof and caused to drop into the part 1ª. The arms of the scraper are mounted on the member 72 which is affixed to the shaft 23' of the worm drive 25'.

The operation of this device is the same as that of Figure 1. The sludge enters through 5' and the filtrate is discharged through 13'. The shaft is alternately rotated and allowed to remain stationary during periods of cleansing and filtration. The thickened sludge settles toward the bottom of the tank and is discharged through the valve 20'.

Although in both of the above-described forms of embodiment of the invention the filtration is brought about by pressure in a closed tank, it will be understood that like results may be brought about in an open tank by means of a suction filter. Many other changes and modifications may be made in the illustrated forms of embodiment of the invention and manner of practicing the same, it being my intention to claim the invention broadly, in whatever manner its principle may be employed.

What I claim is:

1. In combination, a filter tank, a filtering device rotatably supported in said tank, means for feeding sludge to said tank under pressure, and constructed and arranged automatically to stop the supply of sludge to said tank and to rotate said filtering device to cleanse it, at mechanically determined intervals.

2. In combination, a filter tank, a filtering device rotatably supported in said tank, means for feeding sludge to said tank under pressure, means for discharging thickened sludge from said tank, automatically operating means for periodically stopping the supply of sludge to said tank and rotating said filtering device, and means for operating said sludge discharging means in timed relation to said automatically operating means.

3. In combination, a cylindrical filter tank, a filtering device rotatably supported in said tank on an axis corresponding with the axis of said tank, means for feeding sludge to said tank under pressure, means for discharging thickened sludge from said tank, scraping means cooperating with said sludge discharging means arranged to scrape the inside surface of said tank and direct the thickened sludge toward said sludge discharging means, and automatically operating means for periodically stopping the supply of sludge to said tank and rotating said filtering device.

4. In combination, a cylindrical filter tank vertically arranged and having a conical bottom, a filtering device rotatably supported on a vertical axis in said tank, means for feeding sludge to said tank under pressure, means connected with said filtering device for carrying away the filtrate, means at the bottom of said tank for discharging the thickened sludge, a rotatable scraper arranged to scrape the inside of the cylindrical portion and conical bottom of said tank and to direct the thickened sludge toward the sludge discharging means, and automatically operating means for periodically stopping the supply of sludge to said tank and rotating said filtering device.

5. In combination, a filter tank capable of containing under pressure a liquid to be filtered, a rotatable filter element in said tank, and automatically acting control means for causing the filter element to rotate at regular mechanically determined intervals, to cleanse the filter element without the attention of an operator.

6. In combination, a filter tank capable of containing under pressure a liquid to be filtered, a rotatable filter element in said tank, automatic means for causing the filter element to rotate at regular intervals, and automatic means for releasing the pressure in the tank during rotation of the filter element.

7. A filter comprising a tank containing a rotatable filter element, and means constructed and arranged automatically to cause the filter element to rotate after a filtering period of sufficient duration to cause a filter cake to be deposited upon the filter element; and automatically to cause the filter element to cease rotation after an interval of sufficient duration to permit cleansing of the filter element.

8. A filter comprising a tank containing a plurality of filter elements, and means constructed and arranged automatically to release the pressure in the tank and to rotate the elements to cleanse the filter surface thereof after regular filtering intervals, and for cleansing periods of predetermined extent.

9. A filter comprising a tank containing a plurality of filter elements, automatic means for releasing the pressure in the tank and rotating the elements to cleanse the filter surface thereof at regular intervals, and automatic means for opening a discharge vent near the bottom of said filter tank in timed relation with the revolving of the filter elements.

10. In a filter comprising a filter tank, a filter element rotatably mounted within said tank, an outlet from said tank located near the bottom thereof, a valve for controlling said outlet, automatic means for causing the filter element to cleanse itself by rapid rotation at specified intervals, and automatic means for opening the drain valve at specified intervals.

11. In a filter comprising a filter tank, a filter element rotatably mounted within said tank, an outlet from said tank located near the bottom thereof, a valve for controlling said outlet, automatic means for causing the filter element to cleanse itself by rapid rotation at specified intervals, automatic means for opening the drain valve at specified intervals, and scraping means arranged to convey the sludge from the interior of the tank to a point adjacent to the drainage opening thereof.

12. The combination with a cylindrical tank, of means associated with said tank for thickening the sludge therein, and means for forcing back into the sludge matter adhering to the surface of the tank, said means comprising a substantially spiral shaped rotating member for scraping along the entire inner cylindrical surface of the tank.

13. In combination, a cylindrical tank for the sludge to be thickened, a filtering device in said tank, a drainage chamber for filtered liquid associated with said filtering device, a conduit associated with said drainage chamber for conducting away the filtered liquid, means for at times exerting pressure on the said sludge for causing part of the liquid thereof to enter the said drainage chamber and deposit filter cake on the said filtering device, means for at times removing said pressure and bringing about rapid rotation of the said filtering device in the said tank to dislodge filter cake collected on the surface of the said filtering device, a rotating scraping device for removing filter cake collected on the entire area of the cylindrical wall of the said tank, a chamber in the bottom of the said tank for receiving the thickened sludge, and means whereby said thickened sludge may be removed from the said chamber.

14. In combination, a filter tank, a filter normally stationary therein, filter cleansing mechanism adapted to rotate said filter, and controlling mechanism effective at predetermined intervals automatically to cause the filter cleansing mechanism to be operated to rotate said filter, said controlling mechanism being also effective automatically, to terminate the filter cleansing operation, the construction and arrangement being such that filtering periods and cleansing periods are caused to be alternated in accordance with the needs of the work in order that the filtering may proceed at a commercial rate, and this without the attention of an operator.

15. In combination, a filter tank capable of containing a sludge to be thickened, a filter element in the tank, means for supplying a sludge to the tank, the filtrate normally passing from the sludge in the tank through the filter and being conducted away while the filter element is stationary, and means constructed and arranged automatically to reverse the direction of flow of the filtrate through the filter element at intervals by rotation of the filter element, to cleanse the filter element.

In testimony whereof I have affixed my signature to this specification.

ERNEST J. SWEETLAND.